United States Patent [19]
Rowlette

[11] Patent Number: 5,368,960
[45] Date of Patent: Nov. 29, 1994

[54] UTILIZATION EFFICIENCIES BY USING HIGH SULFATE STARTING MATERIALS

[76] Inventor: John J. Rowlette, 264 Melrose Ave., Monrovia, Calif. 91016

[21] Appl. No.: 96,676

[22] Filed: Jul. 23, 1993

[51] Int. Cl.$^5$ ............... H01M 010/06; H01M 004/22
[52] U.S. Cl. ..................... 429/227; 429/228; 205/63
[58] Field of Search ............... 429/227, 228, 225, 232, 429/233, 245; 205/57, 63; 252/182.1

[56] References Cited

U.S. PATENT DOCUMENTS

| | | | |
|---|---|---|---|
| 1,156,686 | 10/1915 | Howard | 429/227 |
| 1,654,778 | 1/1928 | Benner et al. | 429/227 |
| 1,879,639 | 9/1932 | Rowley | 429/227 X |
| 3,169,890 | 2/1965 | Voss et al. | 429/227 X |
| 3,173,810 | 3/1965 | Voss et al. | 429/227 |
| 3,607,408 | 9/1971 | Duddy | 429/227 X |
| 3,733,220 | 5/1973 | Cortese et al. | 429/227 X |
| 3,765,943 | 10/1973 | Biagetti | 429/227 X |
| 4,405,697 | 9/1983 | Rowlette . | |
| 4,507,372 | 3/1985 | Rowlette | 429/228 |
| 4,510,219 | 4/1985 | Rowlette | 429/228 X |
| 4,539,268 | 9/1985 | Rowlette . | |
| 4,542,082 | 9/1985 | Rowlette . | |
| 4,547,443 | 10/1985 | Rowlette et al. . | |
| 4,625,395 | 12/1986 | Rowlette . | |
| 4,658,499 | 4/1987 | Rowlette . | |
| 4,713,306 | 12/1987 | Pinsky et al. . | |
| 4,735,870 | 4/1988 | Rowlette | 429/228 X |
| 5,114,807 | 5/1992 | Rowlette . | |

*Primary Examiner*—Anthony Skapars
*Attorney, Agent, or Firm*—Hawes & Fischer

[57] ABSTRACT

The battery system and process of the present invention enables the increase of the specific energy of the lead-acid battery by using new starting pastes which will allow significantly higher utilization efficiencies of the positive and negative pastes. The invention enables the increased utilization efficiency of both electrodes, to thereby increase the specific energy of the battery. Two paste combinations have been found to be advantageous. First, a battery has at its positive terminal, a lead sulfate ($PbSO_4$) paste and at its negative terminal, a tribasic lead sulfate ($3PbO \cdot PbSO_4 \cdot H_2O$). In a second combination, a paste of lead sulfate ($PbSO_4$) is used at the positive electrode and while a monobasic lead sulfate ($PbO \cdot PbSO_4$), is applied to the negative electrodes.

19 Claims, 1 Drawing Sheet

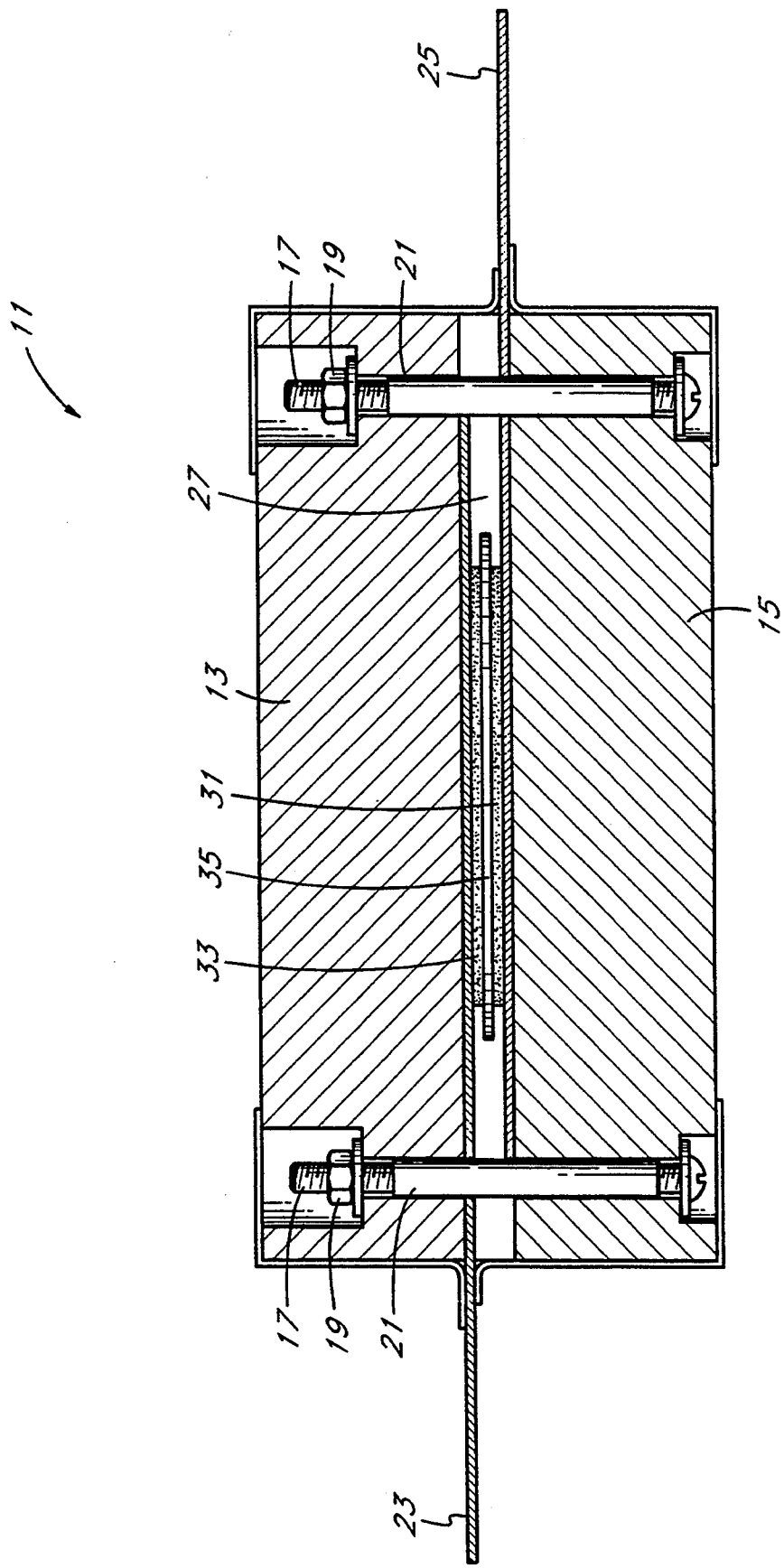

UTILIZATION EFFICIENCIES BY USING HIGH SULFATE STARTING MATERIALS

FIELD OF THE INVENTION

The present invention relates to the field of electrical storage devices. More specifically, the present invention relates to a system and method for increasing the utilization efficiency of a lead-acid storage battery with the use of high sulfate pastes.

BACKGROUND OF THE INVENTION

One of the oldest and best-known devices used to store energy is the lead-acid battery. The technology is based upon the reduction of lead dioxide to lead sulfate at the positive electrode and the simultaneous oxidation of lead to lead sulfate at the negative electrode. The electrolyte, sulfuric acid, is consumed, and energy is discharged during this process. Energy is stored by reversing these reactions; that is, charging the battery.

The energy stored is proportional to the discharge voltage, which is about 2.08 volts per cell, and to the amount of lead species. Lead has a high atomic weight and is an inherently inefficient chemical for battery energy storage. Lead is also used for carrying current within the cell. As a result, the amount of lead required per kilowatt hour of storage may be 50 to 100 pounds, which unfavorably impacts both weight and cost of the storage system. This translates to an energy density of about 10 to 15 watt hours per pound, depending upon battery design, operation, and desired life.

Another way of looking at this low specific energy, is in regard to the high equivalent weights of the starting materials, which is only partially made up for by the very high cell voltage. Another important reason, however, is that very little of the charged, active material is available for discharge. Both positive and negative electrodes typically yield only 20-35% utilization. Anything higher than 60% is a laboratory curiosity. By contrast, both electrodes in a nickel-cadmium cell yield at least 70-80% and sometimes more. Lithium electrodes often approach 100%. Invariably, electrodes in other batteries exhibit utilization efficiencies well beyond the range of those in lead-acid batteries.

Problems relating to the efficiency of usage of batteries come from the reactions occurring within the batteries themselves. During discharge, the lead dioxide which is a fairly good conductor, from the positive plate is converted to lead sulfate, an insulator. The lead sulfate can form an impervious layer encapsulating the lead dioxide particles, thus partially eliminating access of the electrolyte to the active material.

In the case of a standard lead-acid battery, such batteries are easily and commercially available in charged form. By providing a plate made of lead dioxide ($PbO_2$), in the presence of a lead (Pb) plate and sulfuric acid, a charged battery is formed which can then be discharged, and re-charged.

The use of pastes applied to the electrodes has been practiced to increase the availability of the reacting materials. The vertical positive and negative plates of lead based alloy grids have been coated with layers of electrochemically active pastes. In a charged condition, the paste on the positive electrode contains lead dioxide which is the positive active material, and the negative electrodes contain a sponge lead. Typically batteries are formed where both electrodes are lead and act only as conductors, but where the paste alone acts as the electrode material which undergoes chemical change.

One conceivable way to form the $Pb/PbO_2$ battery is to start with the components which would be present in a discharged battery, and apply a charge to form the $Pb/PbO_2$ starting structures. With respect to the negative electrode, and the use of metallic lead, the sponge lead forms fairly easily. However, the $PbO_2$ does not form as readily. In some cases PbO, lead monoxide, interspersed with some free lead can help begin to build the starting structure during the charging reaction. The PbO will form the first $PbO_2$, to be followed by further $PbO_2$ formation. The theory behind the formation of the battery in this manner is that the formed $Pb/PbO_2$ starting structures will have an expanded structure, and therefore be more amenable to reaction during discharge.

The use of pastes as a starting material is particularly useful for the bipolar battery which may be formed by a series of stacked lead plates, typically with one side having the positive paste and the other side having the negative paste. An ion permeable separator typically separates the plates, and the plates themselves form the electrical interconnection between the cells. The use of pastes, although increasing the active species and the overall surface area and availability of the active species, has had no significant effect in minimizing the mechanism described above which limits utilization of the electrodes.

The pastes which have been used today have typically been a "leady" oxide paste, such as PbO interspersed with some elemental free lead. This paste is typically applied to the grids of conventional lead-acid batteries, the grids containing the active ingredients, namely $PbO_2$ are pasted with a "leady oxide" which is primarily PbO containing a small amount of free lead. This is for the purpose of assisting in the charging reaction, as was previously discussed. This contrasts with other battery formulations, such as where two differing pastes are utilized as the beginning of formation of the reactive elements themselves during the charging reaction.

It would be advantageous to begin with an expanded lead dioxide $PbO_2$ as the positive electrode and an expanded sponge lead for the negative electrode. However, obtaining such expansion, without building the battery in reverse through the charging reaction is either impossible or impractical.

Either with or without the conventional use of PbO, the power output of the battery, even in the presence of such pastes, is significantly influenced by its state of discharge. Further, the lead sulfate, especially near the positive electrode can grow into large, hard, angular crystals, which can dislodge active material from the electrodes, and can further impede the reduction to lead at the negative electrode.

A beginning to the solution to the problem of under utilization of batteries was described in U.S. Pat. No. 4,507,372, issued on Mar. 26, 1985 to John J. Rowlette, inventor herein, and entitled "Positive Battery Plate," and which is incorporated herein by reference. The solution outlined in the '372 patent involved the addition of a conductive filler to the pastes. The filler of choice was stated to be tin dioxide, for the positive electrode, rather than the previously used graphite which was noted to undergo a reaction in the presence of the electrolyte to form acetic acid, and then to form lead acetate.

The use of tin dioxide is outlined in U.S. Pat. No. 4,713,306 to Pinsky et al, issued on Dec. 15, 1987 and entitled "Battery Element and Battery Incorporating Doped Tin Oxide Coated Substrate. The substance of this patent is incorporated herein by reference.

The addition of the tin dioxide can be accomplished as a pre-dispersed paste, or as a powder or coating onto a particulate or fibrous substrate, such as glass powder or glass wool. Further, the conductivity of the tin dioxide is greater than that of graphite. Stannic oxide additive is commercially available from Crystal Research of Olympia, Wash.

One of the most important reasons for the limitation in discharge of the active materials of a lead-acid cell is lack of access of the electrolyte to all parts of the active material. When the $PbO_2$ in the positive plate discharges and becomes $PbSO_4$ there is a theoretical volume expansion, based upon the dry compounds, from 25.15 cm$^3$/mole to 48.2 cm$^3$/mole. Assuming this volume expansion in the liquid phase to nearly approximate the volume differential in the solid phase from which these numbers were drawn, it can be seen that the reaction, and its accompanying volume expansion will eventually plug up the pores of the $PbO_2$ and thus prevent the electrolyte from contacting the remaining particles of $PbO_2$, making those remaining particles of $PbO_2$ essentially inaccessible.

A similar problem occurs at the negative electrode, where the volume change from elemental Pb to $PbSO_4$, based upon the dry preparations is from 18.25 cm$^3$/mole to 48.2 cm$^3$/mole. Of course, more utilization can always be achieved if the discharge rate is reduced, since a reduced discharge rate will not cause as rapid plugging and will allow for a more even, orderly expansion. However, such a reduced discharge rate limits the uses of the battery and will not satisfactorily be useful for higher useful discharge rates.

What is therefore needed is a battery composition which permits formation of the electrode materials in an expanded form and which will enable a higher usage for a given amount of current flow. The battery composition should be such that the reactive materials are stable, and that the battery is re-chargeable without a serious reduction in the utilization.

SUMMARY OF THE INVENTION

The system and process of the present invention is therefore to increase the specific energy of the lead-acid battery by using new starting pastes which will allow significantly higher utilization efficiencies of the positive and negative pastes. The invention enables the increased utilization efficiency of both electrodes, to thereby increase the specific energy of the battery. Two paste combinations, which are used to start the battery from its discharged condition, have been found to be advantageous. First, a battery has at its positive terminal, a lead sulfate ($PbSO_4$) paste and at its negative terminal, a tribasic lead sulfate ($3PbO \cdot PbSO_4 \cdot 4H_2O$). In a second combination, a paste of lead sulfate ($PbSO_4$) is used at the positive electrode and while a monobasic lead sulfate ($PbO \cdot PbSO_4$), applied to the negative electrodes.

In both instances, the material used is able to form the proper amount of sulfuric acid during the charging cycle, which is set based upon expected utilization. Further, monobasic lead sulfate yields the least amount of resistance to reformation during the charging step.

BRIEF DESCRIPTION OF THE DRAWINGS

The invention, its configuration, construction, and operation will be best further described in the following detailed description, taken in conjunction with the accompanying drawings in which FIG. 1 is a sectional view of a single cell structure which was utilized to construct single cell realizations of the present invention.

DETAILED DESCRIPTION OF THE PREFERRED EMBODIMENT

This invention replaces, either partially or completely, the commonly used leady oxide with one, or possibly two, compounds of high sulfate content. The high sulfate content means that the starting material is already expanded and porosity is created when the lead compound is reduced to Pb at the negative electrode or oxidized to $PbO_2$ at the positive electrode. Inventors in the past (e.g., Pinsky, Cattley) both used a high concentration of lead sulfate ($PbSO_4$) for the starting paste for the positive electrode. It is the object of this invention to use high sulfate starting pastes in both electrodes in order to achieve the attractive increase in specific energy for the lead-acid battery. Examination of the equations describing the reactions occurring during formation of the battery shows, however, that the use of $PbSO_4$ for both electrodes is decidedly unattractive. During formation, the chemical reactions for the positive and negative electrode reactions are:

$$2H_2O + PbSO_4 \rightarrow PbO_2 + SO_4^= + 4H^+ + 2e^- \quad (1)$$

and $$2e^- + PbSO_4 \rightarrow Pb + SO_4^= \quad (2)$$

and the complete cell reaction is:

$$2PbSO_4 + 2H_2O \rightarrow PbO_2 + Pb + 4H^+ + 2SO_4^= \quad (3)$$

It can be seen that the sulfuric acid concentration of the electrolyte is increasing as the cell or battery is being formed. In the formation process the initial electrolyte specific gravity needs to be at least 1.050 to 1.100 and with conventional pastes much higher than that since almost no sulfuric acid is produced on formation. Regardless of the starting pastes the specific gravity at the end of a full discharge should be in that range. But it is quite obvious that if pure $PbSO_4$ is the staring paste for both electrodes it is impossible to return to that initial specific gravity range without achieving 100% utilization efficiency at both electrodes. Nowhere near 100% efficiency has ever been achieved at either electrode. The effect will be that at full charge the acid concentration will be much too high and the electrolyte weight, and therefore the battery weight will be too high. Further, with lead-acid batteries, a sulfuric acid ($H_2SO_4$) content in excess of about forty four percent causes, in conventional batteries, excessive positive grid corrosion, and increased dendrite growth at the negative paste. Such has not been a problem with the battery and compositions of the present invention.

Two possible approaches to the problem involve the use of high sulfate pastes at the electrodes. First, let us consider the use of $PbSO_4$ as the starting paste for one electrode and tribasic lead sulfate ($3PbO \cdot PbSO_4 \cdot H_2O$), which we shall henceforth call tribase, for the other. In several of the following examples consider both the forward (discharge) reaction, as well as the reverse (charging) reaction. In a good storage battery, good and efficient utilization should allow both reactions to occur without difficulty.

At the conclusion of the charging or reverse reaction, there should be sufficient electrolyte built up to enable the battery to completely discharge, or at least discharge to a minimum level. It is readily calculated from either equation 1 or equation 2 that 1 gram of $PbSO_4$ yields 0.3232 gram of $H_2SO_4$ and from equation 4 only 0.0989 gram of $H_2SO_4$ is produced from 1 gram of tribase. From equation 3 it is calculated that $H_2SO_4$ makes up 30.5% of the total minimum weight of active material. By minimum weight, what is meant is that no other structures are present to add to the weight, and complete stoichiometry is assumed corresponding to 100% utilization. With a utilization efficiency of 50% the $H_2SO_4$ would be 61% of the utilizable weight. Therefore there is an excess weight of acid of 30.5%, making the active mass specific energy (AMSE) 1/1.305 times optimum for the 50% utilization efficiency. This nullifies most of the gain in efficiency. The situation is much worse because a much larger amount of water must be added to the system in order for the acid concentration to be maintained at the proper level. If either electrode has tribase instead of $PbSO_4$ then the situation is very different. If the tribase is used at the negative electrode, for example, the formation reaction becomes:

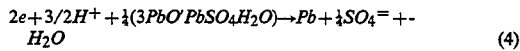
$$2e + 3/2H^+ + \tfrac{1}{4}(3PbO\cdot PbSO_4\cdot H_2O) \rightarrow Pb + \tfrac{1}{4}SO_4^= + \tfrac{1}{4}H_2O \quad (4)$$

and the total cell reaction on formation becomes:

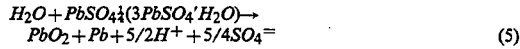
$$H_2O + PbSO_4 \tfrac{1}{4}(3PbSO_4\cdot H_2O) \rightarrow PbO_2 + Pb + 5/2H^+ + 5/4SO_4^= \quad (5)$$

It can be seen that 5/4 moles of $H_2SO_4$ is produced for each mole of $PbO_2$ plus Pb, instead of 2 moles as occurs when both electrodes use pure $PbSO_4$. Pure tribase is a high sulfate material and works best if the initial acid concentration is low. It can be seen that very little acid is formed from the tribase in the direction of charging, and the acid concentration in the fully formed, charged battery may be too low unless a higher amount of sulfuric acid is utilized initially. Note that the components formed upon charging are the same as would be present with a standard lead-acid battery. The difference is in the density of the $PbO_2$ and Pb formed components.

Alternatively, both electrodes may be pasted with monobasic lead sulfate ($PbO\cdot PbSO_4$), hereafter referred to as monobase.

The net cell reaction then becomes:

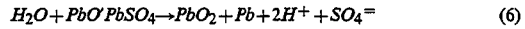
$$H_2O + PbO\cdot PbSO_4 \rightarrow PbO_2 + Pb + 2H^+ + SO_4^= \quad (6)$$

It is seen that just one mole of $H_2SO_4$ is produced for each mole of $PbO_2$ plus Pb. This is optimum if 50% utilization is achieved at both electrodes. Equation 6 illustrates again the formation of the components of a conventional lead-acid battery after the charging reaction.

Table 1 shows a noteworthy comparison of molar volumes between the various lead species in a lead-acid battery. The molar volumes given here are cm³/mole of lead.

TABLE 1

| Molar Volumes of Various Lead Compounds in their dry state | |
|---|---|
| Compounds | Molar Volume |
| Pb | 18.25 |
| $PbO_2$ | 25.15 |
| Tribase | 38.0 |
| Monobase | 38.0 |
| $PbSO_4$ | 48.2 |

Assuming that the relative densities of materials in their dry states is proportional to their densities in the wet state, it can be seen that a large volume loss occurs when any of the high sulfate pastes is converted into $PbO_2$ or especially metallic Pb. This process opens up the pores but precautions must be taken by adding various kinds of fibrous materials to the pastes to prevent them from shrinking and collapsing the pores and, with the so-called starved electrolyte batteries, pulling away from the separator.

Many tests have been performed with cells, and batteries have been formed by charging beginning with using pure $PbSO_4$ for the positive electrodes and tribase for the negatives. Very thick plates (about 0.150" thick for both sides) yield about 45% efficiencies at the 2-hour discharge rate. Standard plates of this thickness yield no more than about 25% at this discharge rate. Yields of more than 50% have been achieved many times with plates on the order of 0.100" thick.

Referring to the FIG. 1, a cross section of a typical single test cell 11. Test cell 11 has an upper structure 13 jointed to a lower structure 15, typical with four bolts 17, although only a pair of bolts 17 secured with nuts 19. Each bolt 17 has an insulator 21 which extends substantially its length and insulates the bolts 17 from electrical contact with the electrodes.

Extending from the left of the cell 11 is the negative electrode 23, and extending from the right of the cell 11 is the positive electrode 25. In the configuration shown, the electrodes 23 and 25 extend beyond the cell 11 boundary to form the current carrying conductors with which the cell 11 is measured. Electrode 23 is in electrical contact with the upper structure 13 while the electrode 25 is in electrical contact with the lower structure 15.

The paste on the positive battery electrode, in this case electrode 25 has a greater tendency to separate from its electrode than does the negative electrode 23 paste. To form an improved battery, the electrodes 25 and 23 are kept horizontal, with the positive electrode 25 having an upwardly directed active surface.

A space 27 is formed between the electrodes 23 and 25 which accommodates a positive paste 31, a negative paste 33 and a separator 35 which separates the pastes 31 and 33. It is understood that the separator 35 will be amenable to the transfer of the ionic species across its boundary in order to permit the chemical reaction to take place. Further, the electrodes 23 and 25 may be made of metallic lead. The cell shown in the FIG. 1, consisting of the electrode 23, the electrode 25 and the materials and structures therebetween may be stacked on other cells to form a multi-celled battery. Since the stacking of one lead electrode 25 atop another lead electrode 23 involves nothing more than electrical contact, adjacent cells in a multi-celled structure may share the same lead electrode.

In the case of FIG. 1, electrode 23, rather than abutting the upper structure 13 would have a positive paste 31 on its upper surface, followed by a separator 35, and then followed by another electrode having a negative paste 33 on its underside and a positive paste 31 on its upper side.

In the preferred embodiment, positive paste 31 will be pure $PbSO_4$, while the negative paste will be tribase ($3PbO'PbSO_4'H_2O$). The remainder of the space will be occupied by the electrolyte, sulfuric acid ($H_2SO_4$) and water.

The starting components for the discharged battery, which will be charged to make the expanded density battery structures are as follows. Lead sulfate may be prepared by reacting litharge (PbO) with $H_2SO_4$. Litharge is added to a large excess of $H_2SO_4$ at 50° to 70° C. and stirred vigorously for about three days, or until it becomes completely white. It is then filtered and washed. Tribase is made by stirring PbO in a large excess of water while adding a stoichiometric amount of 36% $H_2SO_4$ dropwise for about two hours. The stirring must be continued until the material becomes all white, which is usually about 24 hours. This material is then filtered but need not be washed. The reaction for the tribase is carried out at room temperature.

The preparation of monobase is quick and easy. The process is exactly like that for the tribase except that the acid is added dropwise for three hours, at which time the reaction is finished. The stoichiometric amount of acid is, of course, twice the required about for the tribase.

The preferred orientation of the battery is for the plates to be horizontal. The pastes 31 and 33 may be water based with a water content of 20 to 25% water. The positive paste should have a conductive additive, such as conductive stannic oxide as was described for U.S. Pat. No. 4,507,372, above, in order to provide optimum performance. In the '372 patent, the stannic oxide was combined with a glass fiber to enhance its structural stability and support. Typically such a stannic oxide preparation is made using about twenty five weight percent glass fibers and about seventy five weight percent stannic oxide. In the examples cited herein, and for good practice, the battery paste 31 should contain an amount of the stannic oxide preparation added to their mass in a proportion of about twenty percent by weight of stannic oxide preparation to about eighty percent by weight of battery paste to make up the final paste 31. Thus the final paste 31 will have a composition of about 80% by weight of paste mixture, 5% by weight of glass fibers and 15% by weight of stannic oxide.

Further, the paste mixture may or may not contain amounts of PbO, lead monoxide. It is contemplated that PbO may be used, even though the preferred starting materials will be pure. Varying amounts of PbO may be added to the paste mixture to adjust performance characteristics, such as the rate at which constituents are added to the electrolyte during the battery reaction.

The negative paste may also have a sufficient amount of graphite fiber necessary to provide adequate conductivity at the desired discharge rate. Conductivity is important to avoid unwanted overvoltage type reactions occurring at the electrodes. In the overvoltage condition, oxygen may be produced at the positive electrode and hydrogen at the negative electrode.

The negative paste 33 can accept a mix of graphite and expander to favorably affect its conductivity. The expander is usually composed of approximately equal weights of powdered graphite, barium sulfate, and lignosulfonates, each to the extent of about one percent by weight, as added to the negative battery paste. Graphite fibers are intermixed with the expander to the extent of about three percent by weight, with regard to the other constituents of the battery paste. These graphite fibers are usually about one to two microns in diameter and have a length ranging from about one hundred fifty microns to about one and a half millimeters in length. The graphite fibers and expander may be initially mixed to form a mixture of fifty percent by weight fiber and fifty percent by weight expander, before being added to the battery paste. Thus, the battery paste comprises a six percent mixture content with the remaining ninety four percent of the battery paste and additive comprising the pure battery paste before addition of the mixture.

The expander used in the examples herein is grade 4640 commercially available from Anzon, Inc., Philadelphia, Pa. The graphite fibers are commercially available from Fortafil Fibers located in Rockwood, Tenn. The graphite is never added to the positive electrode paste since it would be oxidized.

For hand made, laboratory cells or batteries the pastes may be applied by hand with a spatula. Pasting frames, which may or may not remain with the biplates, are used to both apply the pastes 31 and 33, as well as to determine the thickness of each electrode's paste. Once the frames are pasted and joined with the appropriate separator 35, and the electrolyte is added, the step of charging to form the charged battery can begin.

Table 2 shows the performance of three typical cells which were formed by the method outlined above, by beginning with pastes and then charging. The figures represent real measurements except for the specific energies, which were based upon calculations which ignore the non-active component weight. These cells were made with pure $PbSO_4$ positive paste and pure tribase negative paste before being formed by charging. The electrodes were very thick; about 0.080" positives and 0.065" negatives. These thicknesses correspond to grids in conventional batteries of 0.080" plus 0.065".

TABLE 2

Cell Performance
$PbSO_4$:positive electrode;($3PbO'PbSO_4'H_2O$):negative electrode

| Cell No. | Disch. Time Hrs. | Rate Amps | Capacity, Amp-hrs | Energy Watt-Hours | Positive Util. Percent | Specific Energy Wh/Kg |
|---|---|---|---|---|---|---|
| 155 | 1.04 | 1.65 | 1.72 | 3.33 | 40.8 | 38.6 |
| 155 | 2.13 | 0.90 | 1.92 | 3.75 | 45.5 | 43.5 |
| 155 | 3.14 | 0.65 | 2.03 | 4.00 | 48.4 | 46.4 |
| 196 | 2.36 | 0.92 | 2.17 | 4.27 | 50.6 | 49.5 |
| 198 | 5.90 | 0.42 | 2.48 | 4.90 | 58.4 | 56.9 |

In the above table, each of the identified cell numbers had an area of 47.7 $cm^2$. The performance of the cells of Table 2 reflect five individual data runs.

In another experiment, monobasic paste ($PbO'PbSO_4$) was applied to the positive electrode and the monobasic paste ($PbO'PbSO_4$) was applied to the negative electrode of a battery. A fifty-one percent utilization, with respect to the negative electrode, was obtained with this combination.

Referring to Table 3, the average cell performance for numerous instances where batteries were formed with lead sulfate applied to the positive electrode, and tribase was applied to the negative electrode is shown.

TABLE 3

Average Cell Performance
PbSO4:positive electrode;(3PbO'PbSO4'H2O):negative electrode

| Disch. | | Capacity, Amp-hrs | Energy Watt-Hours | Positive Util. Percent | Specific Energy Wh/Kg |
|---|---|---|---|---|---|
| Time Hrs. | Rate Amps | | | | |
| 1.02 | 1.57 | 1.60 | 3.11 | 38.0 | 36.0 |
| 2.04 | 0.92 | 1.87 | 3.64 | 44.0 | 42.0 |
| 3.00 | 0.63 | 1.89 | 3.90 | 45.0 | 45.0 |

It is contemplated that the invention described herein is particularly applicable to bipolar batteries having multiple cells, and especially where the multiple cells are horizontally oriented.

While the present invention has been described in terms of a lead acid battery, one skilled in the art will realize that the structure and techniques of the present invention can be applied to many types of batteries and electrical structures. The present invention may be applied in any situation where a higher battery utilization is desired.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A battery combination comprising:
   a positive electrode consisting essentially of lead sulfate ($PbSO_4$);
   a negative electrode consisting essentially of at least one constituent selected from the group consisting of:
   tribasic lead sulfate ($3PbO'PbSO_4'H_2O$); and
   monobasic lead sulfate ($PbO.PbSO_4$); and
   an electrolyte in contact with said positive and negative electrodes.

2. The battery combination recited in claim 1 wherein said negative electrode consists of tribasic lead sulfate ($3PbO'PbSO_4'H_2O$), and supportive conductive structures supporting said lead sulfate ($PbSO_4$) and said ($3PbO'PbSO_4'H_2O$).

3. The battery combination recited in claim 2 wherein said supportive conductive structures are horizontally disposed.

4. The battery combination recited in claim 2 wherein said supportive conductive structures are made of metallic lead.

5. The battery combination recited in claim 3 wherein said supportive conductive structures support said lead sulfate ($PbSO_4$) on the upper surface of at least one said supportive conductive structures.

6. A multi-celled battery structure, including the battery combination of claim 1 comprising a plurality of positive electrodes and a plurality of negative electrodes and where, except for one positive electrode and one negative electrode, each one of said plurality of positive electrodes is supported by a supportive conductive structure which also supports an associated one of said plurality of negative electrodes.

7. The battery combination as recited in claim 1 wherein said lead sulfate ($PbSO_4$) is admixed with no more than an effective amount of free lead monoxide (PbO) sufficient to adjust the rate at which constituents are added to the electrolyte during the battery reaction.

8. The battery combination of claim 1 wherein an effective amount of conductive stannic oxide is present with said lead sulfate ($PbSO_4$), to provide sufficient conductivity to allow formation of $PbO_2$.

9. The battery combination of claim 8 wherein said effective amount of conductive stannic oxide is present as a mixture containing a supportive glass material.

10. The battery combination of claim 8 wherein said conductive stannic oxide is present with said lead sulfate ($PbSO_4$) in a ratio of about one part of said stannic oxide to from about four to ten parts of said lead sulfate ($PbSO_4$).

11. The battery combination system of claim 9 wherein said supportive glass material is present with said conductive stannic oxide mixture in a ratio of about one part of said supportive glass material to about three parts of stannic oxide.

12. The battery combination of claim 1 wherein said tribasic lead sulfate ($3PbO'PbSO_4'H_2O$) and said monobasic lead sulfate ($PbO.PbSO_4$) are admixed with an effective amount of graphite and expander mix to provide sufficient conductivity to allow formation of lead (Pb).

13. The battery combination of claim 12 wherein said group consisting of tribasic lead sulfate ($3PbO'PbSO_4'H_2O$) and said monobasic lead sulfate ($PbO.PbSO_4$) are present with said effective amount of graphite and expander mix in a ratio of about one part of said mix to about sixteen parts of said tribasic lead sulfate ($3PbO'PbSO_4'H_2O$) and in a ratio of about one part of said mix to about sixteen parts of said monobasic lead sulfate ($PbO.PbSO_4$).

14. A lead-acid battery cell comprising:
    a positive electrode consisting essentially of lead dioxide ($PbO_2$) formed by the oxidation of lead sulfate ($PbSO_4$);
    a negative electrode consisting essentially of lead (Pb) formed by the reduction of at least one constituent selected from the group consisting of:
    tribasic lead sulfate ($3PbO'PbSO_4'H_2O$); and
    monobasic lead sulfate ($PbO.PbSO_4$); and
    an electrolyte in contact with said positive and negative electrodes.

15. The lead-acid battery as recited in claim 14 and further comprising a plurality of said cells connected in series.

16. The battery combination recited in claim 15 wherein said electrodes are horizontally planar.

17. The battery combination recited in claim 14 wherein said negative electrode and said positive electrode are supported by metallic conductive structures.

18. The battery combination recited in claim 14 wherein said electrolyte is sulfuric acid.

19. The process of forming a lead-acid battery cell comprising the steps of:
    forming a positive electrode by oxidizing lead sulfate ($PbSO_4$) to lead dioxide ($PbO_2$); and
    forming a negative electrode by reducing to lead (Pb) at least one constituent selected from the group consisting of:
    tribasic lead sulfate ($3PbO'PbSO_4'H_2O$); and
    monobasic lead sulfate ($PbO.PbSO_4$);
in the presence of electrolyte in contact with said at least one constituent and said lead sulfate ($PbSO_4$).

* * * * *